United States Patent
Tian et al.

(10) Patent No.: US 9,818,276 B2
(45) Date of Patent: Nov. 14, 2017

(54) FIRE ALARM CONTROLLER CONFIGURATION APPARATUS AND CONFIGURATION METHOD THEREOF

(71) Applicant: Siemens Schweiz AG, Zurich (CH)

(72) Inventors: Shui Ying Tian, Beijing (CN); Ya Ling Zhao, Beijing (CN)

(73) Assignee: SIEMENS SCHWEIZ AG, Zurich (CH)

(*) Notice: Subject to any disclaimer, the term of this patent is extended or adjusted under 35 U.S.C. 154(b) by 0 days.

(21) Appl. No.: 15/200,824

(22) Filed: Jul. 1, 2016

(65) Prior Publication Data

US 2017/0004693 A1   Jan. 5, 2017

(30) Foreign Application Priority Data

Jul. 1, 2015   (CN) .......................... 2015 1 0379709

(51) Int. Cl.
| | |
|---|---|
| G08B 17/12 | (2006.01) |
| G08B 17/00 | (2006.01) |
| G08B 25/14 | (2006.01) |
| G05B 19/042 | (2006.01) |

(52) U.S. Cl.
CPC ......... *G08B 17/00* (2013.01); *G05B 19/0426* (2013.01); *G08B 25/14* (2013.01); *G05B 2219/23236* (2013.01); *G05B 2219/25118* (2013.01)

(58) Field of Classification Search
None
See application file for complete search history.

(56) References Cited

U.S. PATENT DOCUMENTS

| | | | |
|---|---|---|---|
| 5,402,101 A | 3/1995 | Berger et al. | 340/286.02 |
| 6,448,982 B1 | 9/2002 | Klapper et al. | 715/764 |
| 6,661,340 B1 * | 12/2003 | Saylor | G08B 25/016 |
| | | | 340/3.3 |

(Continued)

FOREIGN PATENT DOCUMENTS

| | | | | |
|---|---|---|---|---|
| CN | 202751724 U | 2/2013 | | A62C 37/00 |
| CN | 104299350 A | 1/2015 | | G08B 17/00 |
| CN | 104464158 A | 3/2015 | | A62C 37/00 |

OTHER PUBLICATIONS

Siemens Energy and Automation, Inc., "QUADLOG Safety Matrix," Product Brochure, 5 pages, 2004.

(Continued)

*Primary Examiner* — Curtis King
(74) *Attorney, Agent, or Firm* — Slayden Grubert Beard PLLC

(57) ABSTRACT

A configuration method for a fire alarm controller may include presenting a configuration matrix, in which either the rows represent inputs while the columns represent outputs, or the rows represent outputs while the columns represent inputs, with a matrix element in the configuration matrix being binary data, which indicates whether a causal relationship exists between the input and output in the row and column where the matrix element is located; receiving at least one external input adapted to amend the value of a matrix element in the configuration matrix; and according to the amended configuration matrix, generating a configuration file for updating linkage control logic of the fire alarm controller.

8 Claims, 5 Drawing Sheets

(56) References Cited

U.S. PATENT DOCUMENTS

| | | | |
|---|---|---|---|
| 7,233,243 B2* | 6/2007 | Roche | G08B 13/1618 340/540 |
| 2002/0018478 A1* | 2/2002 | Takeyama | H04L 12/4604 370/401 |
| 2002/0053972 A1* | 5/2002 | Yamaguchi | G08B 17/00 340/506 |
| 2003/0058093 A1* | 3/2003 | Dohi | G08B 17/00 340/506 |
| 2007/0276514 A1 | 11/2007 | Martinez et al. | 700/80 |
| 2010/0218962 A1* | 9/2010 | Robb | A62C 3/10 169/46 |
| 2012/0068842 A1* | 3/2012 | Piccolo, III | G08B 25/14 340/501 |
| 2012/0154141 A1* | 6/2012 | Piccolo, III | G08B 25/14 340/539.11 |
| 2013/0138227 A1 | 5/2013 | Gohr et al. | 700/80 |
| 2013/0285808 A1 | 10/2013 | Piccolo, III | 340/539.17 |
| 2014/0009280 A1* | 1/2014 | Takahashi | G08B 26/003 340/538 |
| 2016/0225251 A1* | 8/2016 | Di Marco | G08B 29/12 |
| 2016/0332012 A1* | 11/2016 | Lenkeit | A62C 35/13 |
| 2017/0084160 A1* | 3/2017 | Piccolo, III | G08B 25/001 |

OTHER PUBLICATIONS

Extended European Search Report, Application No. 16176017.8, 9 pages, dated Nov. 8, 2016.
Chinese Office Action, Application No. 201510379709.1, 7 pages, dated Jan. 5, 2016.

* cited by examiner

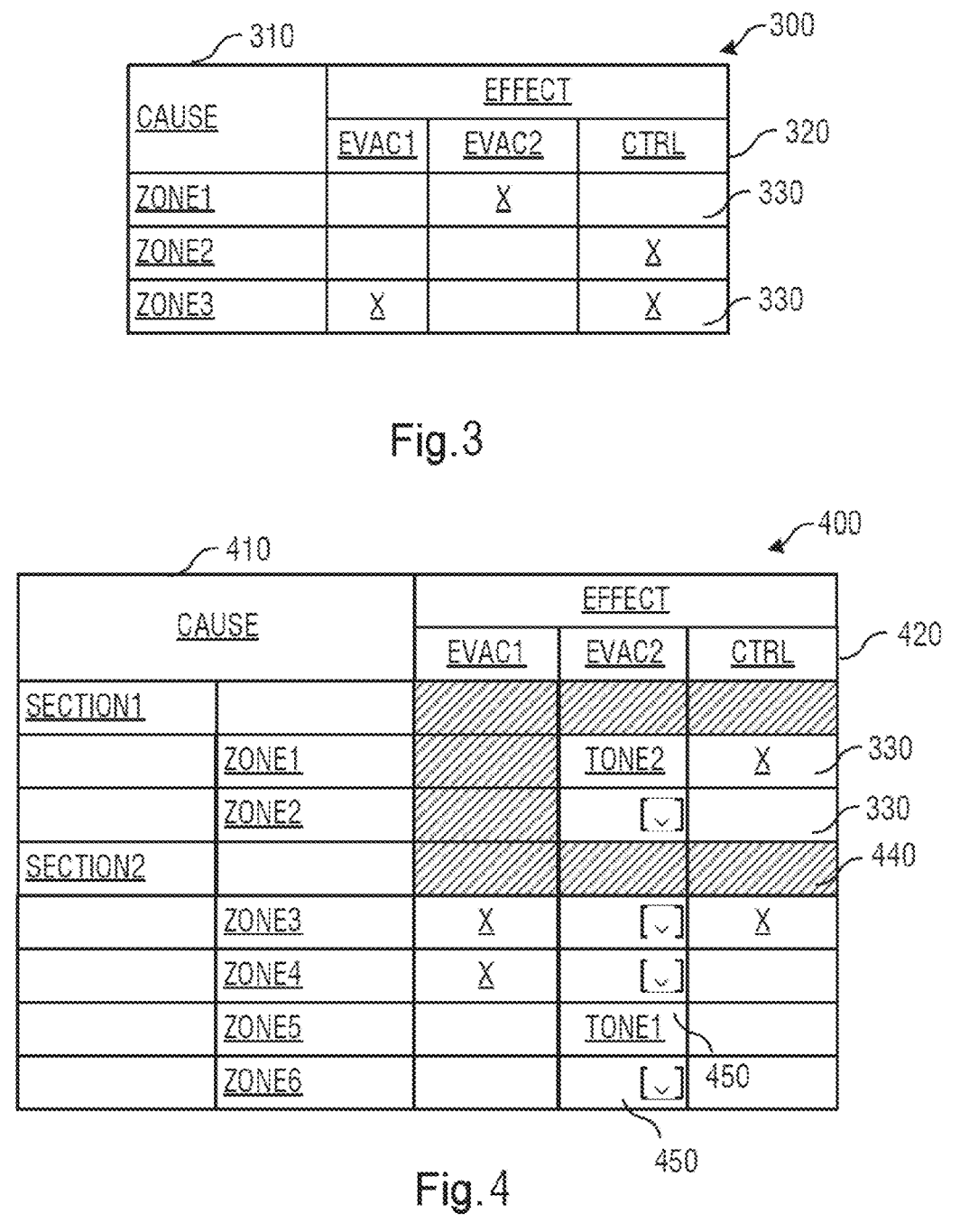

| CAUSE | EFFECT | | |
|---|---|---|---|
| | EVAC1 | EVAC2 | CTRL |
| ZONE1 | | X | |
| ZONE2 | | | X |
| ZONE3 | X | | X |

Fig.3

| CAUSE | | EFFECT | | |
|---|---|---|---|---|
| | | EVAC1 | EVAC2 | CTRL |
| SECTION1 | | | | |
| | ZONE1 | | TONE2 | X |
| | ZONE2 | | [✓] | |
| SECTION2 | | | | |
| | ZONE3 | X | [✓] | X |
| | ZONE4 | X | [✓] | |
| | ZONE5 | | TONE1 | |
| | ZONE6 | | [✓] | |

| PANEL | CAUSE | \\\\ | SOUND | MAIN BOARD IO ||||| CARD || EVAC | CTRL |
|---|---|---|---|---|---|---|---|---|---|---|---|---|
| | | | | PANEL RELAY || PANEL I/O ||| | | | |
| | | | Snder 1 | RT FIRE | RT F | FIRE Ctrl 1 | FIRE Ctrl 2 | | Mon Out | Snder 2 | | |
| | Any Sprinkler Zone | \\\\ | | | | | | | | | | |
| | Any 2 Auto Zone | \\\\ | ✓ | | | X | | | ✓ | ✓ | ✓ | |
| | Any 2 Manual Zone | \\\\ | ✓ | | | | | | ✓ | ✓ | ✓ | |
| | Any Fault | \\\\ | ✓ | | | | | | ✓ | ✓ | ✓ | |
| SECTION1 | ZONE1 | \\\\ | ✓ | | X | | | | ✓ | ✓ | ✓ | |
| | ZONE2 | \\\\ | ✓ | X | | | | | ✓ | ✓ | ✓ | X |
| SECTION2 | ZONE3 | \\\\ | ✓ | | | X | X | | ✓ | ✓ | ✓ | X |
| | ZONE4 | \\\\ | ✓ | | | X | X | | ✓ | ✓ | ✓ | X |
| | ZONE5 | \\\\ | ✓ | | | | | | ✓ | ✓ | ✓ | |
| | ZONE6 | \\\\ | ✓ | | | | | | ✓ | ✓ | ✓ | |

FIRE ALARM CONTROLLER CONFIGURATION APPARATUS AND CONFIGURATION METHOD THEREOF

CROSS-REFERENCE TO RELATED APPLICATIONS

This application claims priority to CN Application No. 201510379709.1 filed Jul. 1, 2015, the contents of which are hereby incorporated by reference in their entirety.

TECHNICAL FIELD

The present invention relates to the field of fire-fighting, in particular to a configuration apparatus for a fire alarm controller and a configuration method thereof.

BACKGROUND

FIG. 1 shows a schematic diagram of a typical fire alarm system. As FIG. 1 shows, in a fire alarm system, various fire detectors, acoustic/optical alarms or manual alarms distributed throughout a building are collectively referred to as peripheral devices 10. These peripheral devices 10 are connected to a fire alarm controller (control panel) 20 via a wired or wireless network. The fire alarm controller 20, also abbreviated as controller 20, receives an input from these peripheral devices 10, for example an alert signal, and monitors the operating state of these peripheral devices 10. When an alert signal is received and it is confirmed that an emergency has occurred, the controller 20 drives an acoustic/optical alarm 10 for example to issue an alert, to prompt personnel in the building to pay attention and promptly evacuate, or even drives a linked device to act to extinguish the fire.

The controller in a fire alarm system must generally be configured before use. The content of configuration includes the addresses, types, objects of monitoring, and linkage control logic, etc. of the various devices connected to the controller. In an existing fire alarm system, the controller generally has a communication interface 22, which can be connected to a terminal device (e.g. a PC or a mobile terminal such as a mobile phone) 30. An operator can use the terminal device 30 to complete various configurations of the controller 20. The communication interface 22 can be any suitable interface type, e.g. a serial port, a wired or wireless network interface, a high-speed parallel interface, etc. As FIG. 1 shows, the terminal device 30 at least comprises a display component 32 and an input component 34. The display component 32 may be a display screen or a projector. The input component 34 may be a mouse, a keyboard, a gesture input capture device, etc.

During configuration, the configuration of linkage control logic is an important part of configuration work. The operator must perform linkage logic configuration on devices which have a causal association therebetween according to the way in which wires are connected on site and the installation situation. Existing ways of performing linkage logic configuration can broadly be divided into two major types: one is configuration based on logic formula, the other is configuration based on tree logic.

In one example, suppose that an area (e.g. a story of a building) has two sections (e.g. different sub-regions), which are marked 1 and 2 respectively. Each section comprises two zones, so each zone (e.g. room) can be marked 1.1 and 1.2, and 2.1 and 2.2. Furthermore, suppose that the linkage control consists of the following: if an alert occurs in 1.1 or 2.1, then an acoustic/optical alert 3.1 in the corresponding region for indicating evacuation is activated. At this time, if a logic formula is used to express the linkage control, it will be 1.1+2.1=3.1, wherein the plus sign indicates an "OR" relationship; 1.1 and 2.1 may represent each hardware device address. The occurrence of an alarm in 1.1 or 1.2 is the cause, and the activation of the acoustic/optical alarm 3.1 is the corresponding linkage result. Expression by such a logic formula is simple, but the meaning of each symbol must be learned in advance and a compiler is needed to check whether an error has been made in the logic formula.

FIG. 2 shows a situation where a tree structure is used to express the linkage control. FIG. 2 shows two tree structures which are associated with each other. In FIG. 2, the left-hand tree is a detection tree; a device in each zone of the detection tree can detect an alert (as a cause), and may also be a device which needs to activate an action (as an effect). The right-hand tree is a control tree, which represents a logical causal control relationship. The control tree may comprise multiple different causal control logics. A fire control (CONTROL FIRE) is shown by way of example in FIG. 2. The fire control specifically includes a cause operator (COURSE OPERATOR) and an effect action (EFFECT ACTION). Below the cause operator, one or more causes may also be further included; these are represented by CAUSE STATUS TRACER1 and CAUSE STATUS TRACER2 in FIG. 2. When configuration is performed, it is necessary to allocate mutual association relationships to nodes on the two different trees. In other words, it is necessary to configure which zone of the detection tree experiences an alert in its hardware as a cause, and which hardware device acts as a result of that cause. In the example shown in FIG. 2, a user configures ZONE1 and ZONE2 in the detection tree to be causes in the control tree (CAUSE STATUS TRACER1 and CAUSE STATUS TRACER2). Furthermore, it is also necessary to configure an effect of a corresponding action in the control tree, e.g. the effect action in FIG. 2 is the activation of an acoustic/optical alert for example in an AREA. Such a manner of configuration is very clear at the logic level, but the configuration process is relatively complex.

As such, there is still a need in the prior art for a novel way to configure linkage logic.

SUMMARY

One embodiment provides a configuration method for a fire alarm controller, the method comprising: presenting a configuration matrix, in which either the rows represent inputs while the columns represent outputs, or the rows represent outputs while the columns represent inputs, with a matrix element in the configuration matrix being binary data, which indicates whether a causal relationship exists between the input and output in the row and column where the matrix element is located, wherein the input is a signal received or sensed by the fire alarm controller, and the output comprises at least one enable signal capable of activating a linked apparatus connected directly or indirectly to the fire alarm controller in response to at least one of the inputs; receiving at least one external input adapted to amend the value of a matrix element in the configuration matrix; and according to the amended configuration matrix, generating a configuration file for updating linkage control logic of the fire alarm controller.

In one embodiment, the configuration matrix also comprises a preset disabled matrix element, which indicates that no causal relationship exists between the input and output in the row and column where it is located, and cannot be amended.

In one embodiment, the configuration matrix also comprises a parameter selectable matrix element having two or more optional parameters, wherein a selected parameter indicates that a causal relationship exists between the input and output in the row and column where the parameter selectable matrix element is located, and the output is related to the selected parameter.

In one embodiment, the presenting step also comprises using a level structure to present two or more inputs of the configuration matrix.

In one embodiment, the presenting step also comprises using a level structure to present two or more outputs of the configuration matrix.

In one embodiment, the configuration matrix is presented on a terminal device connected to the fire alarm controller.

Another embodiment provides a configuration apparatus capable of being connected to a fire alarm controller, comprising: a display component; an input component; a presenting unit, which presents a configuration matrix on the display component, in which configuration matrix either the rows represent inputs while the columns represent outputs, or the rows represent outputs while the columns represent inputs, with a matrix element in the configuration matrix being binary data, which indicates whether a causal relationship exists between the input and output in the row and column where the matrix element is located, wherein the input is a signal received or sensed by the fire alarm controller, and the output comprises at least one enable signal capable of activating a linked apparatus connected directly or indirectly to the fire alarm controller in response to at least one of the inputs; a receiving unit, which is connected to the input component and receives at least one external input from the input component, the external input being adapted to amend the value of a matrix element in the configuration matrix; and a generating unit, which is connected to the presenting unit and the receiving unit, and generates a configuration file according to the amended configuration matrix, the configuration file being used to update linkage control logic of the fire alarm controller.

In one embodiment, the configuration matrix also comprises a preset disabled matrix element, which indicates that no causal relationship exists between the input and output in the row and column where it is located, and cannot be amended.

In one embodiment, the configuration matrix also comprises a parameter selectable matrix element having two or more optional parameters, wherein a selected parameter indicates that a causal relationship exists between the input and output in the row and column where the parameter selectable matrix element is located, and the output is related to the selected parameter.

In one embodiment, the presenting unit also uses a level structure to present two or more inputs of the configuration matrix; and/or uses a level structure to present two or more outputs of the configuration matrix.

BRIEF DESCRIPTION OF THE DRAWINGS

Example aspects and embodiments of the invention are described in detail below with reference to the drawings, in which:

FIG. 3 shows a schematic diagram of a configuration matrix according to an embodiment of the present invention;

FIG. 4 shows a schematic diagram of a configuration matrix according to another embodiment of the present invention;

FIG. 5 shows a schematic diagram of a configuration matrix according to another embodiment of the present invention;

DETAILED DESCRIPTION

Figure 1:
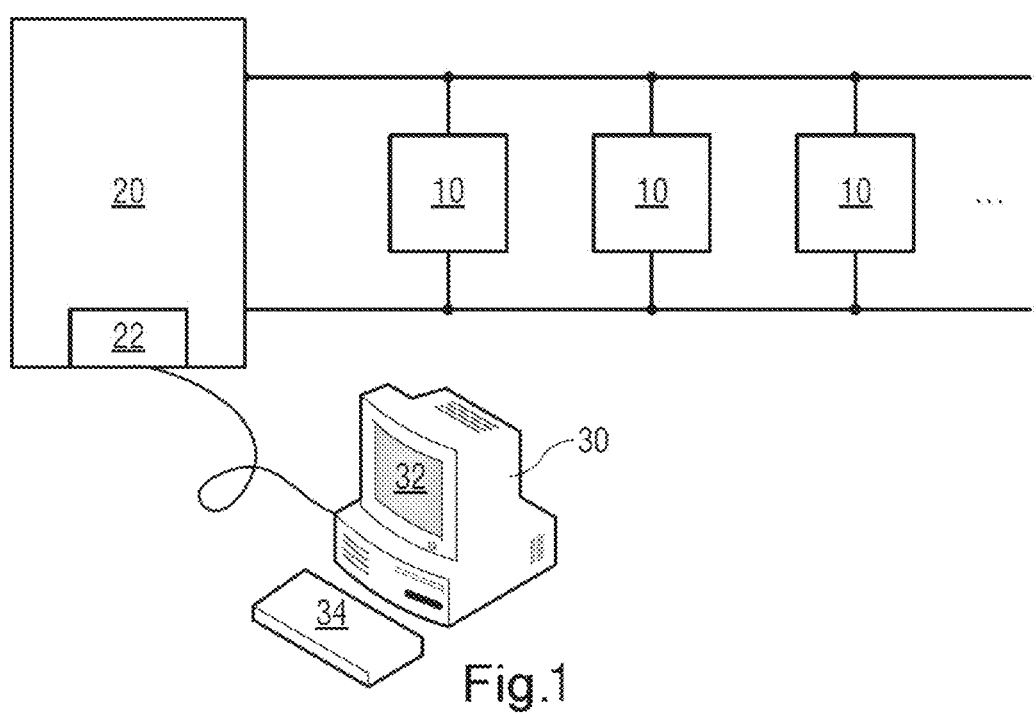
FIG. 1 is a schematic diagram of a typical fire alarm system.
Figure 2:
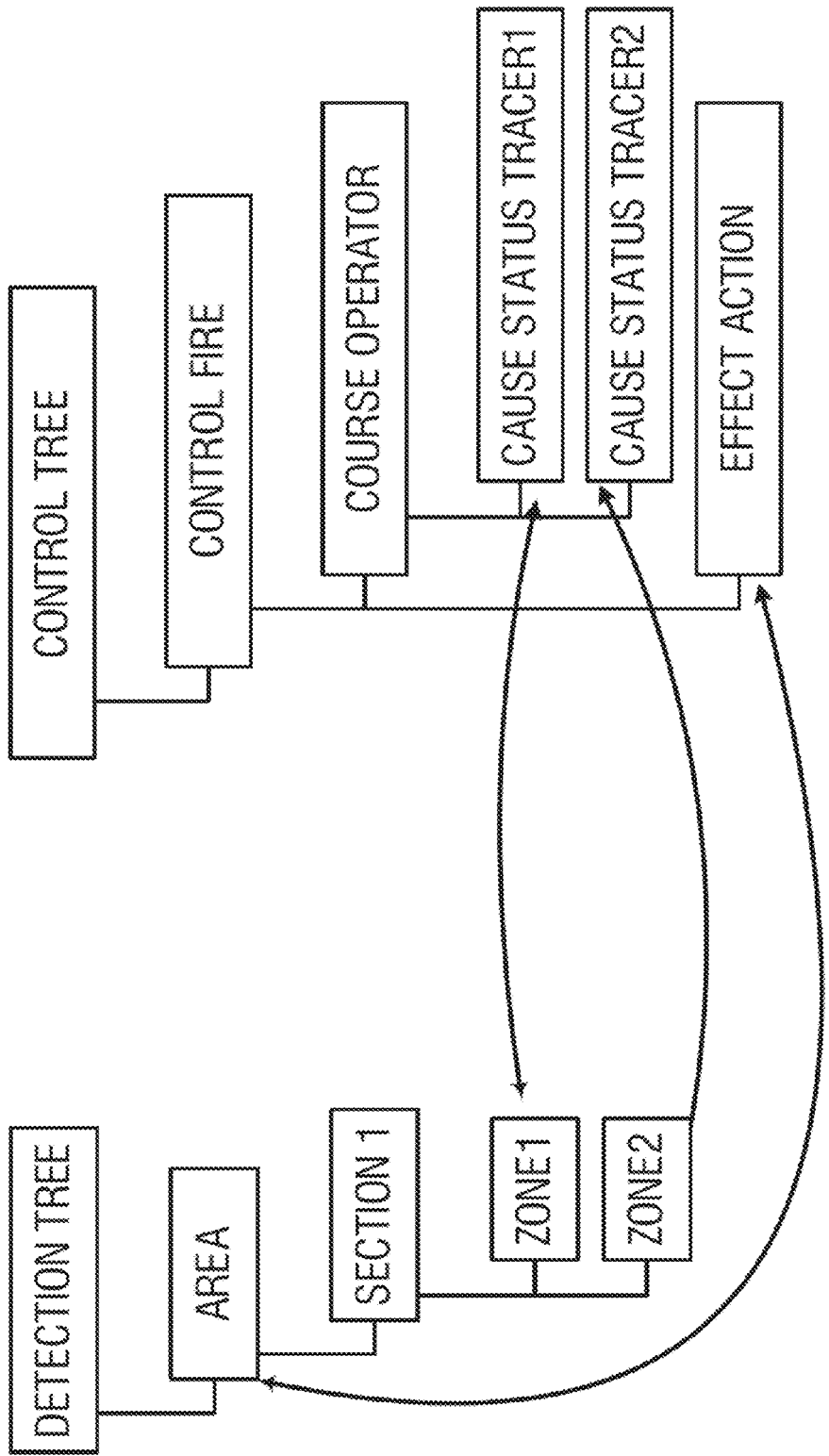
FIG. 2 shows by way of example a schematic diagram of a manner of configuration in which a logic tree is employed in the prior art.

Embodiments of the present invention to provide a configuration method for a fire alarm controller in a fire alarm system and a corresponding configuration apparatus, such that a user can intuitively and conveniently complete configuration of linkage control by using the configuration method or configuration apparatus.

Some embodiments provide a configuration method for a fire alarm controller, the method comprising: presenting a configuration matrix, in which either the rows represent inputs while the columns represent outputs, or the rows represent outputs while the columns represent inputs, with a matrix element in the configuration matrix being binary data, which indicates whether a causal relationship exists between the input and output in the row and column where the matrix element is located, wherein the input is a signal received or sensed by the fire alarm controller, and the output comprises at least one enable signal capable of activating a linked apparatus connected directly or indirectly to the fire alarm controller in response to at least one of the inputs; receiving at least one external input adapted to amend the value of a matrix element in the configuration matrix; according to the amended configuration matrix, generating a configuration file for updating linkage control logic of the fire alarm controller.

The configuration matrix may also comprise a preset disabled matrix element, which indicates that no causal relationship exists between the input and output in the row and column where it is located, and cannot be amended. Preferably, the configuration matrix also comprises a parameter selectable matrix element having two or more optional parameters, wherein a selected parameter indicates that a causal relationship exists between the input and output in the row and column where the parameter selectable matrix element is located, and the output is related to the selected parameter. Preferably, the presenting step also comprises: using a level structure to present two or more inputs of the configuration matrix, or using a level structure to present two or more outputs of the configuration matrix.

The configuration matrix may be presented on a terminal device connected to the fire alarm controller.

Other embodiments provide a configuration apparatus connected to a fire alarm controller, comprising: a display component; an input component; a presenting unit, which presents a configuration matrix on the display component, in which configuration matrix either the rows represent inputs while the columns represent outputs, or the rows represent outputs while the columns represent inputs, with a matrix element in the configuration matrix being binary data, which indicates whether a causal relationship exists between the input and output in the row and column where the matrix element is located, wherein the input is a signal received or sensed by the fire alarm controller, and the output comprises at least one enable signal capable of activating a linked apparatus connected directly or indirectly to the fire alarm controller in response to at least one of the inputs; a receiving unit, which is connected to the input component and receives at least one external input from the input component, the external input being adapted to amend the value of a matrix element in the configuration matrix; a generating unit, which is connected to the presenting unit (710) and the receiving unit, and generates a configuration file according to the amended configuration matrix, the configuration file being used to update linkage control logic of the fire alarm controller.

The configuration matrix may also comprise a preset disabled matrix element, which indicates that no causal relationship exists between the input and output in the row and column where it is located, and cannot be amended. Preferably, the configuration matrix also comprises a parameter selectable matrix element having two or more optional parameters, wherein a selected parameter indicates that a causal relationship exists between the input and output in the row and column where the parameter selectable matrix element is located, and the output is related to the selected parameter. Preferably, the presenting unit also uses a level structure to present two or more inputs of the configuration matrix; and/or uses a level structure to present two or more outputs of the configuration matrix.

Other embodiments provide a machine-readable storage medium, which stores commands for making a machine execute the configuration method described above.

Other embodiments provide a computer program, wherein when the computer program is run in a machine, the machine is made to execute the configuration method described above.

By adopting the configuration method, the configuration apparatus, and the terminal device connected to a fire alarm controller as provided in embodiments of the present invention, configuration of linkage control logic can be realized conveniently and intuitively.

Aspects of present invention are explained in further detail below in conjunction with the accompanying drawings and embodiments. It should be appreciated that the particular embodiments described here are merely intended to explain the present invention, not to limit it.

To furnish a clearer understanding of the technical features, object and effects of the present invention, particular embodiments of the present invention are now explained with reference to the accompanying drawings, in which identical labels represent identical parts.

In this text, "schematic" means "serving as a real instance, an example or an illustration". No drawing or embodiment described as "schematic" herein should be interpreted as a more preferred or more advantageous technical solution.

To make the drawings appear uncluttered, only those parts relevant to the present invention are shown schematically in the drawings; they do not represent the actual structure thereof as a product. Furthermore, to make the drawings appear uncluttered for ease of understanding, in the case of components having the same structure or function in certain drawings, only one of these is drawn schematically, or only one is marked.

In this text, "a" does not only mean "just this one", but may also mean the case of "more than one".

In this text, "first" and "second" etc. merely serve to differentiate between parts, and do not indicate their order or degree of importance, and do not indicate a requirement for co-existence.

FIG. 3 shows by way of example a schematic diagram of a manner of configuration according to an embodiment of the present invention. As FIG. 3 shows, in this embodiment, neither a logic formula nor a tree structure is used anymore; instead, a configuration matrix is used to present and realize configuration of linkage control logic. Specifically, a configuration matrix 300 as shown in FIG. 3 is presented on the display component 32 of the terminal device 30 shown in FIG. 1. The configuration matrix 300 shown in FIG. 3 is for example a 3*3 matrix. In the configuration matrix 300, rows represent linkage causes (CAUSE), while columns represent effects (EFFECT) caused when relevant cause conditions are satisfied, i.e. must be set to be a valid output. The meanings of the inputs represented by the rows in FIG. 3 are set out in column 310. The meanings of the outputs represented by the columns in FIG. 3 are set out in row 320. The outputs of the columns can activate or start up a hardware device connected directly or indirectly to a fire alarm controller, so as to realize the relevant linkage. Each matrix element 330 in the configuration matrix 300 may for example be a binary value, i.e. a valid value or invalid value. The validity/invalidity of a matrix element 330 can indicate the existence/non-existence of a causal relationship, also called a linkage logic relationship, between the input of the row in which the matrix element 330 is located and the output of the column in which the matrix element is located. The content of the matrix element 330 is precisely content which needs to be configured by an operator. Clearly, the meanings of rows and columns in the matrix 300 in FIG. 3 may also be exchanged. In the following explanation, matrix elements with the same properties are shown using the same or similar illustrations, and are indicated by the same label. For example, in FIG. 3, the matrix elements of the 3*3 matrix all have the same binary properties, and so can all be represented by binary element 330.

Based on a configuration matrix (such as the configuration matrix 300 shown in FIG. 3) configured by the user, a configuration program running on the terminal device 30 can generate a corresponding configuration file according to the configuration matrix. The configuration file can be downloaded onto the fire alarm controller 20 via the connection between the fire alarm controller 20 and the terminal device 30. When restarted, the fire alarm controller 20 reads the updated configuration file and parses a corresponding logic relationship. When running, the fire alarm controller 20 controls the input and output ports thereof according to the configured logic relationship, or configures input and output ports of peripheral devices connected directly or indirectly thereto.

For instance, in the example given in FIG. 3, the rows representing causes (as indicated by the column labeled 310) comprise inputs received in three different zones, represented by ZONE1, ZONE2 and ZONE3 respectively. The zone may be a room, multiple rooms, or an open region of a given area. The inputs of the three different zones may be multiple different inputs received or sensed in each zone. For example, in the firefighting field, zones are generally divided into automatic detection zones (Automatic Zones), manual trigger zones (Manual Zones), sprinkling action zones (Sprinkler Zones), etc. The inputs of each type of zone differ somewhat. For instance, an input in an automatic zone may be a fire alert signal from a smoke sensing detector. An input in a manual zone may be an input signal that a manual alarm has been triggered. An input in a sprinkler zone may be an input that sprinkling has been activated. For the different inputs of these different zones, an operator can configure corresponding outputs according to actual requirements. In the example of FIG. 3, the outputs of the configuration matrix 300 comprise EVAC1, EVAC2 and CTRL. EVAC1 and EVAC2 represent outputs for activating an evacuation instruction apparatus, e.g. for activating one or more acoustic/optical alarm(s) in a particular zone. The number after EVAC can identify different zones. A zone controlled by an evacuation instruction is also called an evacuation zone (EVAC ZONE). Similarly, CTRL represents control outputs. By setting a CTRL output to be valid, the action of a device in the corresponding zone can be driven, e.g. a fire door in a particular zone can be closed, or sprinkling can be activated, etc. Zones under the control of different CTRLs are also called CONTROL ZONES. Each column in the configuration matrix 300 may correspond to an output for controlling an on-site device or a hardware device. One output may be used to control the action of one or more devices. Multiple different causes may also cause the same output to be valid.

The example shown in FIG. 3 is a configuration matrix configured by an operator. The operator can set the matrix elements to be valid/invalid at the points of intersection of rows and columns, i.e. at the positions of the matrix elements, according to the actual circumstances. If a matrix element is valid (indicated by an X in the figure), this indicates that a causal relationship exists between the row and column in which the matrix element is located. Specifically, as FIG. 3 shows, the first row/second column is set to a valid value "X", which indicates that a ZONE1 input can cause the EVAC2 output to be valid. For instance, if ZONE1 indicates that a fire has been detected in room no. 1, then EVAC2 is set to be valid, for the purpose of driving a group of acoustic/optical alarms in a corridor zone outside room no. 1 to begin emitting sound or flashing light. Similarly, the second row/third column is set to be valid "X", which indicates that a ZONE2 input (e.g. a manual alarm) can cause the CTRL output to be valid. For instance, if ZONE2 indicates that a manual alarm in room no. 2 has been activated, then CTRL is set to be valid, for the purpose of driving activation of a sprinkling device associated with room no. 2, so as to extinguish the fire. In addition, in FIG. 3, the two matrix elements in the third row/first column and the third row/third column are both set to be valid "X". This means that if ZONE3 for example receives a fire alert, then the EVAC1 and CTRL outputs are set to be valid simultaneously, i.e. in the case of an alert in room no. 3 for example, an acoustic/optical alarm is activated, and a sprinkling device is activated.

In the configuration matrix 300 shown in FIG. 3, each valid matrix element represents a causal relationship between an input and an output. To complete the configuration, the operator need only set the point of intersection (matrix element) of a row and column which have a causal relationship to be valid. This simplifies the factors which need to be taken into account by the operator, to facilitate configuration by the operator. In turn, it can be seen from FIG. 3 that in the configuration matrix 300, inputs which might be used as causes (e.g. an alert signal or sprinkling action) are all set out in the left-hand column. Similarly, outputs which can execute corresponding actions in response to causes are all set out above the columns. The operator can see at a glance which zones need to be monitored, and discover whether all of the devices which need to act have been taken into account. At the same time, if a particular row of the configuration matrix is observed, the operator can discover very easily which outputs are caused by an input. Similarly, if a particular column of the configuration matrix is observed, then the operator can discover which causes (inputs) can cause the same output. In this way, the entire configuration matrix can provide the operator with a comprehensive, intuitive configuration result, which facilitates prompt discovery of omissions by the operator.

FIG. 4 shows by way of example a configuration matrix 400 according to an embodiment of the present invention. Similarly to FIG. 3, the rows (indicated in the column labeled 410) of the configuration matrix 400 in FIG. 4 also represent inputs (e.g. an alert input, manual alarm input, etc.), while the columns thereof (indicated in sequence in the row labeled 420) likewise represent outputs (e.g. a sprinkling action, acoustic/optical alarm enablement, etc.). Unlike FIG. 3, the cause section in FIG. 4 has a tree structure. As FIG. 4 shows, the causes which serve as rows comprise two levels. A first level is SECTIONS; a second level is ZONES. Each section comprises a number of zones. For instance, a first section (SECTION1) comprises two zones, ZONE1 and ZONE2. A second section (SECTION2) comprises four zones, ZONE3-ZONE6. In this way, the row side of the configuration matrix 400 can provide a level structure which is the same as the actual situation.

In the example shown in FIG. 4, some of the matrix elements 440 have been shaded. These matrix elements 440 represent disabled matrix elements, i.e. no causal relationship exists between the row and column in which the matrix element is located, and the user cannot add a causal relationship therefor. In software, a gray region is generally used to identify the disabled matrix element. The presence of disabled matrix elements can avoid a situation where the operator erroneously configures causal logic which should not be there into the fire alarm controller.

In addition, in the example shown in FIG. 4, the matrix elements of the second column EVAC1 are the same as in FIG. 3. If a matrix element is marked as valid "X", this indicates that a causal relationship exists between the row and column in which it is located. This is the same as in FIG. 3, and will not be repeated here. Unlike FIG. 3, the matrix elements 450 in the third column are not binary values, but instead are parameter selectable matrix elements having multiple parameter options. As FIG. 4 shows, the matrix element 450 may have a pull-down menu button. By clicking this button, the operator can see a number of optional parameters. The output of the third column is EVAC2, i.e. an acoustic/optical alarm output. For instance, the acoustic/optical alarm output may have three optional sound frequencies. The operator may select a suitable sound frequency according to the cause in the corresponding row. For example, a sound frequency "TONE2" may be selected for ZONE1 of the first section (SECTION1), whereas a sound frequency "TONE1" may be selected for ZONES of the second section (SECTION2). Such a parameter selection has two meanings: one is to indicate the causal relationship between ZONE1 and EVAC2 for example, another is to set the parameter for activation of EVAC2 (to emit a sound alert at TONE2). By adopting such an arrangement, the operator can configure the linkage logic and at the same time set the operating mode of the activated device in a single operation. Optionally, the optional parameter may not be limited to the sound frequencies shown in this embodiment, but may also be many other types of parameter, such as flashing light frequency, flashing light intensity, duration of sprinkling, etc.

FIG. 5 shows a configuration matrix 500 according to another embodiment of the present invention. On the basis of FIG. 4, inputs of the fire alarm controller (PANEL) itself are added to the row side of the configuration matrix 500 as causes, and various hardware outputs forming a tree structure are added to the column side of the configuration matrix 500. As FIG. 5 shows, in the left-hand column 510, in addition to the sections and zones which are same as those shown in FIG. 4, signals that are received or sensed by the fire alarm controller (PANEL) itself also serve as causes. For instance, ANY SPRINKLER ZONE indicates that activation of a sprinkling action in any sprinkler zone is detected at the fire alarm controller side. ANY 2 AUTO ZONE indicates that an alert in any two automatic sensing zones is detected at the fire alarm controller side. ANY 2 MANUAL ZONE indicates that reception of a manual alarm in any two manual trigger zones is detected at the fire alarm controller side. ANY FAULT indicates that a fault is detected at the fire alarm controller side. The operator can set corresponding outputs in response to these inputs obtained by the fire alarm controller itself. The manner of configuration is the same as in FIG. 3 or FIG. 4, and is not repeated here.

The level relationships among the various hardware outputs are set out above each column (in row 520) of the configuration matrix 500 in FIG. 5. As FIG. 5 shows, the main board input and output port (MAIN BOARD IO) on the fire alarm controller (PANEL) comprises for example three main types of interface. The first type is a sound circuit (SOUND); the specific output interface name thereof is Snder 1. The second type is a relay on the main board of the controller (PANEL RELAY); a specific interface thereof comprises for example a remote fire (RT FIRE) or remote fault alert (RT F). The third type comprises an input/output interface, PANEL I/O, on the main board of the controller; a specific interface thereof comprises for example system state control outputs FIRE Ctrl1 and FIRE Ctrl2. In addition to the main board, an expansion card (CARD) may also be provided on the fire alarm controller, the expansion card comprising for example a monitoring output (Mon Out), i.e. Snder2. In addition, the configuration matrix 500 also comprises an EVAC output and a CTRL output which are similar to those in FIGS. 3 and 4. It can be seen from FIG. 5 that the outputs which can serve as effects can similarly present the level relationship thereof, or present such a level relationship in the form of a tree. In this way, the operator can intuitively observe the subordination relationship among the hardware outputs, and associate these with the inputs serving as rows as required.

In the configuration matrix shown in FIG. 5, the matrix elements may comprise multiple forms. The matrix elements may comprise binary matrix elements 330, disabled matrix elements 440 and parameter selectable matrix elements 450.

Figure 6:
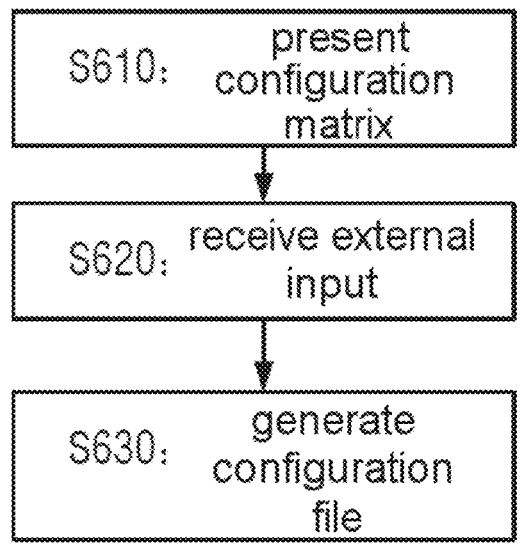
FIG. 6 is a flow chart of a configuration method according to another embodiment of the present invention.

FIG. 6 shows by way of example a flow chart of the configuration method according to an embodiment of the present invention. As FIG. 6 shows, the configuration method according to the present invention comprises the following steps.

Step S610: presenting a configuration matrix, e.g. configuration matrices 300, 400 and 500 as shown in FIGS. 3-5. In the configuration matrix, either the rows represent inputs while the columns represent outputs, or the rows represent outputs while the columns represent inputs. The inputs which serve as causes may comprise at least one input received or sensed by the fire alarm controller and the peripheral components for example. The outputs may comprise at least one enable signal, which can activate a corresponding linked apparatus in response to one of the inputs. The matrix element in the configuration matrix is preferably a binary value, which indicates whether a causal relationship exists between the input and output in the row and column where the matrix element is located.

Step S620: receiving at least one external input adapted to amend the value of any matrix element in the configuration matrix. This external input may be a switch quantity (also called a binary value) that is set in a matrix element by the operator, or may be a selection made by the operator in a parameter selectable matrix element. Optionally, the external input may also be a preconfigured configuration matrix table uploaded by the operator. The parameter selectable matrix element may have two or more optional parameters. Selecting any valid parameter therefrom indicates that a causal relationship exists between the input and output of the row and column where the parameter selectable matrix element is located, and the output can enable the relevant linked apparatus according to the parameter selected.

Step S630: according to the amended configuration matrix, generating a configuration file for updating linkage control logic of the fire alarm controller.

Preferably, one or more disabled matrix elements can be preset in step S610; the state thereof cannot be amended. A disabled matrix element indicates that no causal relationship exists between the input and output of the row and column where it is located.

Figure 7:
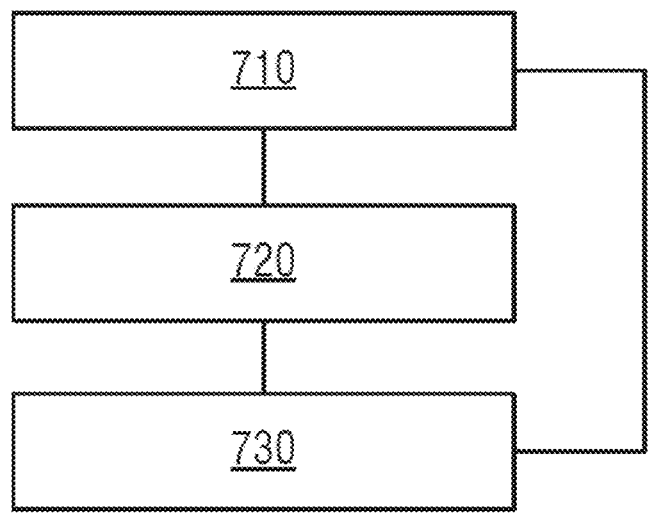
FIG. 7 is a functional block diagram of a configuration apparatus according to an embodiment of the present invention.

FIG. 7 shows by way of example a functional block diagram of a configuration apparatus according to an embodiment of the present invention. The configuration apparatus may be mounted on a terminal device 30. As FIG. 7 shows, the configuration apparatus according to the present invention comprises a presenting unit 710, an input unit 720 and a generating unit 730.

The presenting unit 710 may present a configuration matrix on a display component 32 of a terminal device 30, e.g. configuration matrices 300, 400 and 500 shown in FIGS. 3-5. In the configuration matrix, either the rows represent inputs while the columns represent outputs, or the rows represent outputs while the columns represent inputs. The inputs which serve as causes may comprise at least one input received by the fire alarm controller or sensed by the peripheral components for example. The outputs comprise at least one enable signal, which can activate a corresponding linked apparatus in response to one of the inputs. The matrix element in the configuration matrix is preferably a switch quantity, which indicates whether a causal relationship exists between the input and output in the row and column where the matrix element is located. Preferably, one or more disabled matrix elements can be preset in the presenting unit 710 when the configuration matrix is presented; the state thereof cannot be amended. A disabled matrix element indicates that no causal relationship exists between the input and output of the row and column where it is located.

The input unit 720 is connected to an input component 34, to receive at least one external input for amending the state of any matrix element in the configuration matrix. This external input may be a switch quantity that is set in a matrix element by the operator, or may be a selection made by the operator in a parameter selectable matrix element. Optionally, the external input may also be a configuration matrix table uploaded by the operator. The parameter selectable matrix element may have two or more optional parameters. Selecting any valid parameter therefrom indicates that a causal relationship exists between the input and output of the row and column where the parameter selectable matrix element is located, and the output can enable the relevant linked apparatus according to the parameter selected. The external input may be realized in multiple ways such as by a mouse, a keyboard, a touch panel or a gesture.

The generating unit 730 is connected to the input unit 720 and the presenting unit 710, and generates a configuration file according to the amended configuration matrix. The configuration file is used to update linkage control logic of the fire alarm controller.

The present invention may also provide a machine-readable storage medium, which stores commands for making a machine execute the configuration method described in this text. Specifically, a system or apparatus equipped with a storage medium may be provided, wherein software program code realizing the functions of any one of the above embodiments is stored on the storage medium, and a computer (or CPU or MPU) of the system or apparatus reads and executes the program code stored on the storage medium.

In this case, the program code read from the storage medium is itself capable of realizing the functions of any one of the above embodiments, hence the program code and the storage medium on which the program code is stored form part of the present invention.

Embodiments of storage media used to provide program code include floppy disks, hard disks, magneto-optical disks, optical disks (e.g. CD-ROM, CD-R, CD-RW, DVD-ROM, DVD-RAM, DVD-RW, DVD+RW), magnetic tape, non-volatile memory cards and ROM. Optionally, a communication network may download program code from a server computer.

In addition, it should be clear that not only can part or all of an actual operation be completed by executing program code read out by a computer, but an operating system operating on a computer can also be made to complete part or all of the actual operation by means of commands based on the program code, so as to realize the function of any one of the above embodiments.

In addition, it can be appreciated that program code read out from the storage medium is written into a memory installed in an expansion board inserted in the computer, or written into a memory installed in an expansion unit connected to the computer, and thereafter commands based on the program code make a CPU etc. installed on the expansion board or expansion unit execute part or all of an actual operation, so as to realize the function of any one of the above embodiments.

The above embodiments are merely preferred embodiments of the present invention, which are not intended to limit it. Any amendments, equivalent substitutions or improvements etc. made within the spirit and principles of the present invention shall be included in the scope of protection thereof.

What is claimed is:

1. A configuration method for a fire alarm controller, the method comprising:
    displaying to a user, via a display device, a configuration matrix in which either the rows represent inputs and the columns represent outputs, or the rows represent outputs and the columns represent inputs, wherein the intersection of each row and each column of the displayed configuration matrix defines a displayed matrix element;
    wherein a first portion of the displayed matrix elements in the configuration matrix represent user-adjustable matrix elements indicating a user-adjustable value that indicates whether a causal relationship exists between the input and output in the row and column in which the respective adjustable matrix element is located,
    wherein a second portion of the displayed matrix elements in the configuration matrix display represent non-adjustable matrix elements indicating that no causal relationship exists between the input and output in the row and column in which the respective non-adjustable matrix element is located;
    wherein the input comprises a signal received or sensed by the fire alarm controller, and the output comprises at least one enable signal capable of activating a linked apparatus connected directly or indirectly to the fire alarm controller in response to at least one of the inputs;
    receiving user input via a user interface to amend the value of at least one user-adjustable matrix element in the configuration matrix;
    preventing user input via the user interface to amend any non-adjustable matrix element in the configuration matrix; and
    based on the user input for amending the at least one user-adjustable matrix element, generating a configuration file for updating linkage control logic of the fire alarm controller.

2. The configuration method of claim 1, wherein the user-adjustable matrix elements includes a parameter selectable matrix element having two or more optional parameters, wherein a selected parameter indicates that a causal relationship exists between the input and output in the row and column in which the parameter selectable matrix element is located, wherein the output is related to the selected parameter.

3. The configuration method of claim 1, wherein the displaying step further comprises using a level structure to present two or more inputs of the configuration matrix.

4. The configuration method of claim 1, wherein the displaying step further comprises using a level structure to present two or more outputs of the configuration matrix.

5. The configuration method of claim 1, wherein the configuration matrix is displayed on a terminal device connected to the fire alarm controller.

6. A configuration apparatus configured to connection to a fire alarm controller, the configuration apparatus comprising:
    an input unit;
    a display unit configured to display a configuration matrix in which either the rows represent inputs and the columns represent outputs, or the rows represent outputs and the columns represent inputs, wherein the intersection of each row and each column of the displayed configuration matrix defines a displayed matrix element,
    with a first portion of the displayed matrix elements in the configuration matrix represent user-adjustable matrix elements indicating a user-adjustable value that indicates whether a causal relationship exists between the input and output in the row and column in which the respective adjustable matrix element is located,
    wherein a second portion of the displayed matrix elements in the configuration matrix display represent non-adjustable matrix elements indicating that no causal relationship exists between the input and output in the row and column in which the respective non-adjustable matrix element is located,
    wherein the input comprises a signal received or sensed by the fire alarm controller, and the output comprises at least one enable signal capable of activating a linked apparatus connected directly or indirectly to the fire alarm controller in response to at least one of the inputs;

a receiving unit connected to the input unit and configured to:
  receive user input via the input unit, the user input configured to amend the value of at least one user-adjustable matrix element in the configuration matrix; and
  prevent user input to amend any non-adjustable matrix element in the configuration matrix; and
a generating unit connected to the presenting unit and the receiving unit and configured to generate a configuration file based on the user input for amending the at least one user-adjustable matrix element, the configuration file being used to update linkage control logic of the fire alarm controller.

7. The configuration apparatus of claim 6, wherein the user-adjustable matrix elements includes a parameter selectable matrix element having two or more optional parameters, wherein a selected parameter indicates that a causal relationship exists between the input and output in the row and column in which the parameter selectable matrix element is located, wherein the output is related to the selected parameter.

8. The configuration apparatus of claim 6, wherein the display unit utilizes a level structure to display at least one of (a) two or more inputs of the configuration matrix or (b) two or more outputs of the configuration matrix.

* * * * *